(12) United States Patent
Liu et al.

(10) Patent No.: US 11,800,043 B2
(45) Date of Patent: Oct. 24, 2023

(54) VIDEO PROCESSING METHOD AND APPARATUS, AND COMPUTER-READABLE MEDIUM AND ELECTRONIC DEVICE

(71) Applicant: Beijing Bytedance Network Technology Co., Ltd., Beijing (CN)

(72) Inventors: Gao Liu, Beijing (CN); Shu Tao, Beijing (CN); Jie Yang, Beijing (CN); Yujia Wang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/881,360

(22) Filed: Aug. 4, 2022

(65) Prior Publication Data

US 2022/0377253 A1     Nov. 24, 2022

Related U.S. Application Data

(63) Continuation of application No. PCT/CN2021/077989, filed on Feb. 25, 2021.

(30) Foreign Application Priority Data

Apr. 27, 2020 (CN) .......................... 202010345811.0

(51) Int. Cl.
H04N 5/262 (2006.01)
H04N 5/272 (2006.01)

(52) U.S. Cl.
CPC ........... *H04N 5/2621* (2013.01); *H04N 5/272* (2013.01)

(58) Field of Classification Search
CPC ...... H04N 5/2621; H04N 5/262; H04N 5/265; H04N 5/272; H04N 9/74
See application file for complete search history.

(56) References Cited

U.S. PATENT DOCUMENTS 5,227,863 A    7/1993  Bilbrey et al.
2012/0221383 A1*  8/2012  Shore ................. G06Q 30/0631
                                         386/E5.028

(Continued)

FOREIGN PATENT DOCUMENTS

CN    107770450 A    3/2018
CN    108012091 A    5/2018

(Continued)

OTHER PUBLICATIONS

International Search Report issued in corresponding in International Application No. PCT/CN2021/077989 dated May 12, 2021.

(Continued)

*Primary Examiner* — Kelly L Jerabek
(74) *Attorney, Agent, or Firm* — ARENTFOX SCHIFF LLP

(57) ABSTRACT

The present disclosure relates to a video processing method and apparatus, a computer-readable medium and an electronic device. The method is applied to a first terminal, including: identifying a target object in a current video frame; receiving a special effect setting instruction input by a user; determining a plurality of special effects to be superposed according to the special effect setting instruction; and superposing the plurality of special effects to be superposed with the target object to acquire a processed video frame. In this way, synchronous superposition of a plurality of special effects can be implemented by one video processing process based on the current video frame, so that the plurality of special effects can take effect at the same time, thereby improving processing efficiency of special effects. In addition, an unnecessary intermediate video rendering process is also omitted, which is beneficial to improve terminal performance and user experience.

19 Claims, 8 Drawing Sheets

(56) References Cited

U.S. PATENT DOCUMENTS

2020/0177823 A1* 6/2020 Zhu .................. H04N 7/141
2022/0217275 A1* 7/2022 Fan .................. H04N 23/667
2023/0007189 A1* 1/2023 Balaji ................ H04N 5/2621

FOREIGN PATENT DOCUMENTS

| CN | 109040615 A  | 12/2018 |
|----|--------------|---------|
| CN | 109104586 A  | 12/2018 |
| CN | 110070496 A  | 7/2019  |
| CN | 110221822 A  | 9/2019  |
| CN | 111510645 A  | 8/2020  |
| JP | 2012109896 A | 6/2012  |

OTHER PUBLICATIONS

Chinese Office Action 1 issued in corresponding Chinese Application No. 2020103458110 dated Apr. 27, 2020.
Chinese Office Action 2 issued in corresponding Chinese Application No. 2020103458110 dated Apr. 27, 2020.
Decision on Rejection issued in corresponding Chinese Application No. 2020103458110 dated Apr. 27, 2020.

* cited by examiner

VIDEO PROCESSING METHOD AND APPARATUS, AND COMPUTER-READABLE MEDIUM AND ELECTRONIC DEVICE

CROSS-REFERENCE TO RELATED APPLICATIONS

This application is a continuation of International Application No. PCT/CN2021/077989, filed on Feb. 25, 2021, which claims priority to Chinese Patent Application No. 202010345811.0, filed on Apr. 27, 2020. The disclosures of the aforementioned applications are hereby incorporated by reference in their entireties.

TECHNICAL FIELD

The present disclosure relates to the field of video technology and, in particular, to a video processing method and apparatus, a computer-readable medium and an electronic device.

BACKGROUND

At present, many video applications can support special effect processing on a video screen to meet a using requirement of a user. Among them, a special effect refers to special effects implemented by computer software. For example, beautifying and deforming a character in the video screen; blurring and replacing background of the character in the video screen; and adding a sticker and filtering the character in the video screen, etc.

In the related art, the user is usually only supported to perform adding and preview operations for one special effect. If the user would like to add a plurality of special effects to the video, since an application only supports adding one special effect to the video at a time, the application needs to process and provide previews a plurality of times in order to add the plurality of special effects to the video. This way of special effect processing will lead to low special effect processing efficiency, increase of burden of video rendering and poor user experience.

SUMMARY

This Summary section is provided to introduce concepts in a simplified form, which will be described in detail in the Description of Embodiments section that follows. This Summary section is not intended to identify key features or essential features of the claimed technical solution, and not intended to be used to limit the scope of the claimed technical solution either.

In a first aspect, the present disclosure provides a video processing method, applied to a first terminal, including: identifying a target object in a current video frame; receiving a special effect setting instruction input by a user; determining a plurality of special effects to be superposed according to the special effect setting instruction; and superposing the plurality of special effects to be superposed with the target object to acquire a processed video frame.

In a second aspect, the present disclosure provides a video processing apparatus, applied to a first terminal, including: an identifying module, configured to identify a target object in a current video frame; a first receiving module, configured to receive a special effect setting instruction input by a user; a first determining module, configured to determine a plurality of special effects to be superposed according to the special effect setting instruction; and a video processing module, configured to superpose the plurality of special effects to be superposed with the target object to acquire a processed video frame.

In a third aspect, the present disclosure provides a computer-readable medium having a computer program stored thereon, where the program, when the executed by a processing apparatus, implements steps of the video processing method provided in the first aspect of the present disclosure.

In a fourth aspect, the present disclosure provides an electronic device, including: a storage apparatus having a computer program stored thereon; and a processing apparatus, configured to execute the computer program in the storage apparatus, to implement steps of the video processing method provided in the first aspect of the present disclosure.

In a fifth aspect, the present disclosure provides a computer program product, where the program product includes: a computer program which, when executed by a processor, implements steps of the method according to the first aspect of the present disclosure.

In a sixth aspect, the present disclosure provides a computer program which, when executed by a processing apparatus, implements steps of the method according to the first aspect of the present disclosure.

In the above technical solution, after receiving the special effect setting instruction input by the user, a plurality of special effects to be superposed are determined according to the special effect setting instruction, and the plurality of special effects to be superposed are superposed for the target object in the current video frame, so as to acquire a processed video frame. In this way, synchronous superposition of a plurality of special effects can be implemented by one video processing process based on the current video frame, so that the plurality of special effects can take effect at the same time, thereby improving the processing efficiency of special effects. In addition, since the video frame superposed with the plurality of special effects can be directly acquired, the application can provide the user with the video frame superposed with the plurality of special effects by one video rendering process. In this way, by omitting unnecessary intermediate video rendering process, not only video processing efficiency and terminal performance can be improved, but also user experience can be improved.

Other features and advantages of the present disclosure will be described in detail in the following Description of Embodiments section.

BRIEF DESCRIPTION OF DRAWINGS

The above and other features, advantages and aspects of the embodiments of the present disclosure will become more apparent in conjunction with the accompanying drawings and with reference to the following detailed implementations. Throughout the drawings, the same or similar reference numbers refer to the same or similar elements. It should be understood that the drawings are schematic and that the devices and elements are not necessarily drawn to scale. In the accompanying drawings.

DESCRIPTION OF EMBODIMENTS

Figure 1:
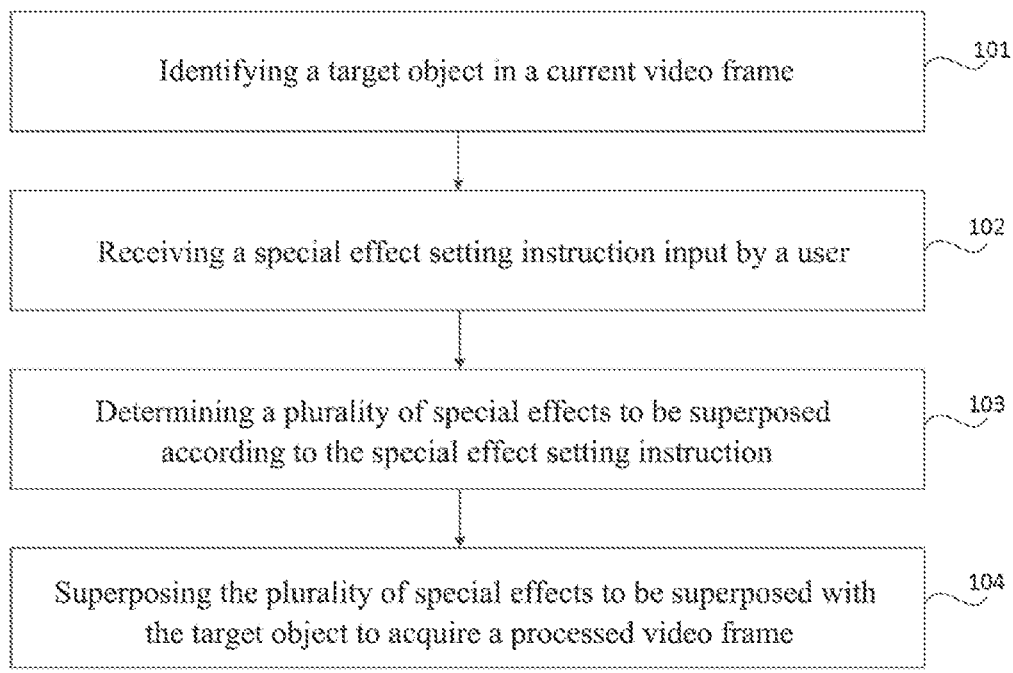
FIG. 1 is a flowchart of a video processing method according to an exemplary embodiment.

Embodiments of the present disclosure will be described in more detail below with reference to the drawings. While certain embodiments of the present disclosure are shown in the drawings, it should be understood that the present disclosure may be embodied in various forms and should not be interpreted as being limited to the embodiments set forth herein, rather, these embodiments are provided for the purpose of a more thorough and complete understanding of the present disclosure. It should be understood that the drawings and the embodiments of the present disclosure are only for exemplary purposes, and are not used to limit the protection scope of the present disclosure.

It should be understood that the respective steps described in method embodiments of the present disclosure may be performed in a different order, and/or performed in parallel. Further, the method embodiments may include additional steps and/or omit performing the illustrated steps. The scope of the present disclosure is not limited in this regard.

The term "including" and variations thereof used herein are open-ended inclusions, that is, "including but not limited to". The term "based on" means "at least partially based on"; the term "an embodiment" means "at least one embodiment"; the term "another embodiment" means "at least one of other embodiments"; and the term "some embodiments" means "at least some embodiments". Relevant definitions of other terms will be given in the description below.

It should be noted that concepts such as "first" and "second" mentioned in the present disclosure are only used to distinguish different apparatuses, modules or units, and are not used to limit a sequence or a relation of interdependence of functions performed by these apparatuses, modules or units.

It should be noted that modifications of "a" and "a plurality" mentioned in the present disclosure are illustrative rather than restrictive, and should be understood as "one or more" by those skilled in the art, unless otherwise expressly indicated in the context.

Names of messages or information exchanged between a plurality of apparatuses in the implementations of the present disclosure are only for illustrative purposes, and are not intended to limit the scope of these messages or information.

FIG. 1 is a flowchart of a video processing method according to an exemplary embodiment. The video processing method can be applied to a first terminal. As shown in FIG. 1, the method may include S101 to S104:

in S101, identifying a target object in a current video frame, in S102, receiving a special effect setting instruction input by a user:

in S103, determining a plurality of special effects to be superposed according to the special effect setting instruction; and in S104, superposing the plurality of special effects to be superposed with the target object to acquire a processed video frame.

Specifically, the above video processing method can be applied to a first application installed on the first terminal, the first application has a video processing capability. Exemplarily, the first application may include any one of the following: an application applied for a video call, an application applied for a short video, an application applied for a live broadcast, an application applied for teleconference, an application applied for social, etc. Or, the first application may include an application dedicated to video special effect processing.

The first application acquires the video frame captured by an image capture apparatus as the current video frame. Among them, the image capture apparatus may be provided with the first terminal installed with the first application, or, the image capture apparatus may be provided separately from the first terminal installed with the first application, which is not limited by the present disclosure. The image capture apparatus may be any form of apparatus with video frame acquiring capability. For example, the image capture apparatus may be a camera, or an electronic device installed with a camera, etc. In one embodiment, the first application may also acquire a video frame processed by other application as the current video frame. It is not limited by the present disclosure.

A target object in the current video frame can be anything in the current video frame. For example, the target object may be a character. In the case that there are a plurality of characters in the current video frame, the target object may be all characters existing in the current video frame, or may be one or several characters among the plurality of characters. For example, the target object may be a character whose face area occupies the largest proportion in the video screen. The target object can be identified by using the relevant image processing technology, which is not described or limited herein.

In the present disclosure, the first terminal installed with the first application may be any type of terminal device, including but not limited to: a smart phone, a tablet computer, a personal digital assistant, a notebook computer, a desktop computer, a wearable electronic device, etc.

During the running of the first application, the first application may provide a special effect setting interface to the user. In one embodiment, the special effect setting interface includes a preview area and a special effect setting area, and the special effect setting area is provided with a plurality of special effect setting components. By an operation of the plurality of special effect setting components on the special effect setting interface, the user can perform a plurality of special effect settings on the target object in the video displayed in the preview area (for example, a character in the video), and watch the video after setting special effects in real time through the preview area.

When the user performs the special effect setting operation, the first application can receive the corresponding special effect setting instruction, where the special effect setting instruction can indicate which kind of special effect setting operation the user has applied. For example, when the user selects to superpose a certain special effect, the first application may receive the special effect setting instruction, and by the special effect setting instruction, the first application may learn the special effect selected to superpose by the user. It should be noted that, during the running of the first application, the user can adjust the special effect in real time, correspondingly, the first application may also receive the corresponding special effect setting instruction in real time.

It should be noted that, in the present disclosure, the execution sequence of S101 and S102 is not specifically limited. For example, S101 may be executed first and then S102 may be executed, or S102 may be executed first and then S101 may be executed, or S101 and S102 may be executed simultaneously. In FIG. 1, S101 being performed first and then S102 being performed is for exemplary description, which is not limited in the present disclosure.

After receiving the special effect setting instruction input by the user, the first application may determine the plurality of special effects to be superposed according to the special effect setting instruction. In the present disclosure, the first application may provide a plurality of special effects for the user to select. For example, the first application may provide the user with the plurality of special effects by setting a plurality of special effect setting components on the special effect setting interface. The special effect type refers to a category to which the special effect belongs, such as a "beauty" type, a "filter" type, a "sticker" type, a "background" type, and so on. The user can select one or more of the provided different types of special effects as the special effects to be superposed. For example, if the user selects to add two special effects "background" and "sticker", according to the received special effect setting instruction, the first application can determine that these two special effects are to be superposed. After that, the first application may superpose the plurality of special effects to be superposed with the target object to acquire the processed video frame.

For example, the first application can identify the feature information of the target object, and the feature information can include, for example, position feature information, human skeleton feature information, face feature information, etc. After that, the first application can superpose the plurality of special effects to be superposed with the target object based on the plurality of special effects to be superposed and the feature information corresponding to each special effect to be superposed, to obtain the processed video frame. Among them, the processed video frame can be rendered for presentation. In an optional implementation, the processed video frame can be presented by the first application through the preview area.

For example, assuming that the target object in the current video frame is a character, and the plurality of special effects to be superposed determined according to the special effect setting instruction include "background" type special effects and "sticker" type special effects, the first application can superpose the above two special effects and the character in the current video frame, to obtain the video frame with "background" type special effects and "sticker" type special effects. It should be understood that superposing the "background" type special effect with the character in a video frame refers to processing the background of the character in the video frame, that is, it can be understood as performing superposition processing on the foreground character in the video frame and the "background" special effect to be superposed.

In one embodiment, the first application may display the special effect setting interface, where the special effect setting interface includes the special effect setting area, and the special effect setting area is provided with the plurality of special effect setting components. In this way, the user may operate one or more of the plurality of setting components in the special effect setting interface to select the special effects to be superposed. Correspondingly, the first application can continuously detect the operation on the plurality of special effect setting components, and receive the special effect setting instruction input by the user. For example, the first application can continuously detect an adding operation for the "sticker" type special effect setting component and for the "background" type special effect setting component. In this way, the special effect setting instruction input by the user is received, so that the special effect to be superposed includes two special effects "background" and "sticker". Further, the special effect setting interface can also display the preview area. Before superposing the special effects, the preview area can present the video frame captured from the image capture apparatus, and after superposing the special effects, the preview area can display the video frame after superposing the plurality of special effects in real time.

Figure 2A:
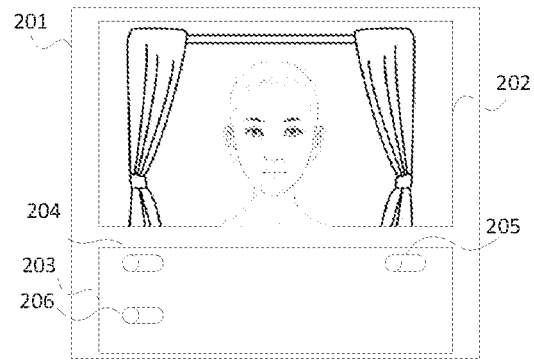
FIG. 2A to FIG. 2B show schematic diagrams of an application scenario of the video processing method provided by the present disclosure.
Figure 2B:
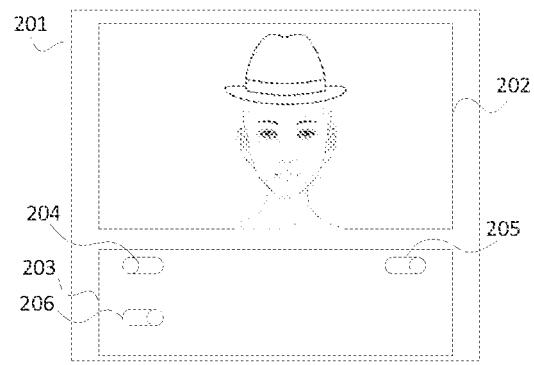

FIG. 2A and FIG. 2B show schematic diagrams of an application scenario of the video processing method provided by the present disclosure.

As shown in FIG. 2A and FIG. 2B, the special effect setting interface displayed on the first application 201 may include a preview area 202 and a special effect setting area 203, and the special effect setting area 203 of the special effect setting interface is provided with a "beauty" type special effect selection component 204, a "background" type special effect selection component 205, and a "sticker" type special effect selection component 206.

For example, when the first application is started, the first application 201 acquires the video frame captured by the image capture apparatus. Since the user has not yet selected to add special effects at this moment, the video frame is displayed in the preview area 202. As shown in FIG. 2A, the video frame is displayed in the preview area 202. Among them, in FIG. 2A, the currently shown component states of the "beauty" type special effect setting component 204, the "background" type special effect setting component 205, and the "sticker" type special effect setting component 206 in the special effect setting area 203 indicate that "beauty" type special effects, "background" type special effects, and "sticker" type special effects are not enabled.

When the user operates in the special effect setting area 203, the first application 201 continuously detects the user's operations for the special effect setting components 204-206 in the special effect setting area 203, to determine the special effect setting instruction input by the user. For example, when it is detected that the user selects to add the two special effects "background" and "sticker" by continuously starting the components corresponding to the "background" and the "sticker", the first application 201 can superpose a default background image of "background" type special effects and a default sticker content of "sticker" type special effects, with the target object (e.g., a character) to obtain the processed video frame. For example, the default background image of the "background" type special effects is a blank image, and the default sticker content of the "sticker" type special effects is a hat. As shown in FIG. 2B, the first application 201 can present the video frame with both the above two special effects superposed with the target object in real time through the preview area 202, and, in FIG. 2B, the currently shown component states of the "background" type special effect setting component 205, and the "sticker" type special effect setting component 206 in the special effect setting area 203 indicate that "background" type special effects and "sticker" type special effects are enabled.

In addition, the special effect setting components in the special effect setting area 203 may include, but are not limited to: a button component, a gesture component, a speech recognition component, a facial recognition component, etc. Correspondingly, the user's operation for the special effect setting component is detected to determine the special effect setting instruction input by the user may respectively include: determining the special effect setting instruction input by the user by detecting a user's click operation on the button component; determining the special effect setting instruction input by the user by detecting a user's gesture; determining the special effect setting instruction input by the user by detecting a speech instruction input by the user; and determining the special effect setting instruction input by the user by detecting a facial feature of the user, etc., which are not limited in the present disclosure.

In addition, in the present disclosure, the user can adjust or modify special effects in real time as required. For example, when operating in the special effect setting area 203, the user selects to delete the two special effects "background" and "sticker" by closing the components corresponding to the "background" and the "sticker", the first application 201 can present the video frame with both the two special effects "background" and "sticker" deleted from the target object in real time through the preview area 202. Or, after the "background" type special effects and "sticker" type special effects have been superposed on the target object in the video frame, when the user operates in the special effect setting area 203, and then selects to add "beauty" type special effects by starting the component corresponding to "beauty", the first application 201 can present the video frame with "beauty" type special effects, "background" type special effects and "sticker" type special effects superposed on the target object through the preview area 202. In addition, the first application 201 may also set a sub-special effect setting option in each special-special effect setting component, and determine the sub-special effects of each special effect to be set by the user by detecting the user's operation on the sub-special effect setting option. The specific detection and superposition methods are similar to those described above, for brevity, details are not repeated herein.

Through the above technical solution, the synchronous superposition of the plurality of special effects can be implemented by one video processing process based on the current video frame, so that the plurality of special effects can take effect at the same time, thereby improving the processing efficiency of special effects. In addition, since the video frame superposed with the plurality of special effects can be directly acquired, the terminal can provide the user with the video frame superposed with the plurality of special effects by one video rendering process. In this way, by omitting the unnecessary intermediate video rendering process, not only the video processing efficiency and the terminal performance can be improved, but also the user experience can be improved.

The specific implementation of determining a plurality of special effects to be superposed according to the special effect setting instruction in S103 will be illustrated in the following.

Figure 3:
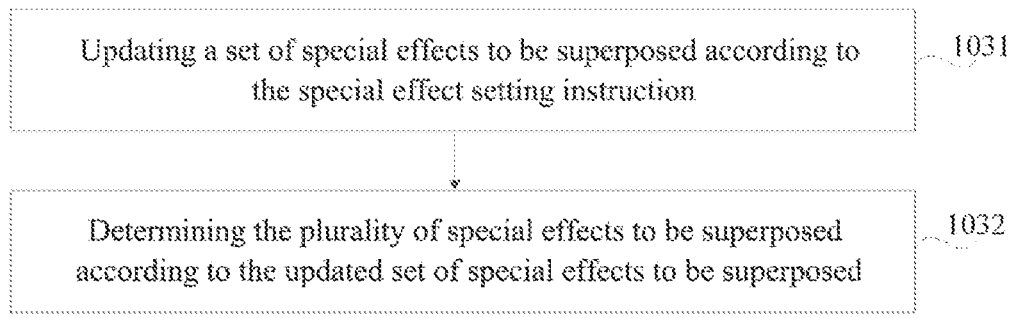
FIG. 3 is a flowchart of a method for determining a plurality of special effects to be superposed according to an exemplary embodiment.

FIG. 3 is a flowchart of a method for determining a plurality of special effects to be superposed according to an exemplary embodiment. As shown in FIG. 3, the above step 103 may include S1031 and S1032.

In S1031, updating a set of special effects to be superposed according to the special effect setting instruction.

In this embodiment, each of the plurality of special effects to be superposed includes at least one sub-special effect to be superposed. The sub-special effect represents a sub-item of special effect included in each special effect. For example, taking the plurality of special effects to be superposed including "beauty" type special effects and "sticker" type special effects as an example, the sub-special effect to be superposed included in the "beauty" type special effects may include, but are not limited to, a "lipstick" sub-special effect, a "face-lift" sub-special effect, etc. The sub-special effects to be superposed included in the "sticker" type special effects may include a sub-special effect with the content of the sticker being a hat, a sub-special effect with the content of the sticker being a cat's face, and other sub-special effects with different patterns and shapes. The "background" type special effects may include sub-special effects with different background images.

In an embodiment, if it is detected that the user selects to add a certain special effect, the first application may superpose the default sub-special effect of the special effect with the target object in the video frame. In addition, the first application can also set a plurality of sub-special effect setting components for each special effect, so that the user can further set one or more sub-special effects corresponding to each special effect, so as to perform special effect processing on the target object in the video frame.

Figure 4:
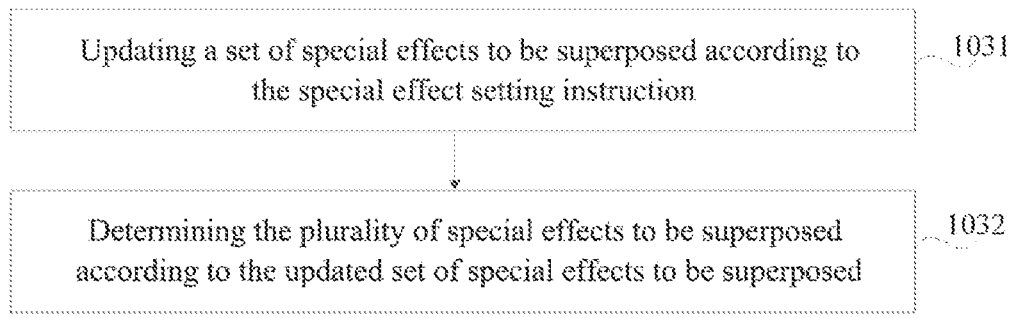
FIG. 4 shows a schematic diagram of another application scenario of the video processing method provided by the present disclosure.

For example, when the user operates in the special effect setting area 203 and selects to add a "background" type special effect, the special effect setting area 203 of the first application 201 may further provide a sub-special effect setting components included in the "background" type special effect. As shown in FIG. 4, when it is detected that the user has started the "background" type special effect setting component 205, the first application 201 sets sub-special effect setting components of different background images in the special effect setting area 203, for example, a sub-special effect setting component 2051 of a background image 1, a sub-special effect setting component 2052 of a background image 2, and a sub-special effect setting component 2053 of a background image 3. In addition, the first application 201 may further provide a sub-special effect setting component 2054 for the user to select an image locally from the first terminal as a background image.

It should be noted that when the setting component of each sub-special effect included in the "background" type special effect is displayed in the special effect setting area 203, the sub-special effect setting component can be covered with the "sticker" type special effect setting component 206, that is, the "sticker" type special effect setting component 206 cannot be displayed in the special effect setting area 203 in FIG. 4. However, after the user has selected the background image to be added, the setting component of each sub-special effect included in the "background" type special effects will exit display from the special effect setting area 203, accordingly, the "sticker" type special effect setting component 206 will be displayed in the special effect setting area 203 again (shown as special effect setting area 203 in FIG. 2B).

The first terminal locally stores the set of special effects to be superposed, and elements in the set of special effects to be superposed may include a special effect parameter of each sub-special effect to be superposed in a plurality of special effects to be superposed, among them, the special effect parameter may include the special effect category to which the corresponding sub-special effects to be superposed belongs, for example, the special effect parameter of the "lipstick" sub-special effect may include a parameter used to indicate that the "lipstick" sub-special effect belongs to the "beauty" type special effects. In addition, the specific form of the set of special effects to be superposed may be set to, for example, an array, a list, etc., which is not limited in the present disclosure. Considering that when the first application subsequently accesses the set of special effects to be superposed, it is mostly random access, and the array can better support random access. Therefore, preferably, the specific form of the set of special effects to be superposed may include the form of array.

In an embodiment, the special effect setting instruction may include an instruction for indicating to add, delete or adjust sub-special effects, the first terminal may update the set of special effects to be superposed according to the instruction for indicating to add, delete or adjust sub-special effects.

Figure 5A:
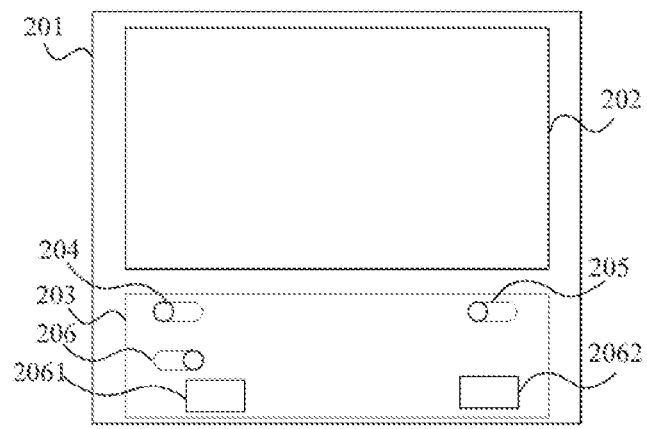
FIG. 5A to FIG. 5C show schematic diagrams of another application scenario of the video processing method provided by the present disclosure.
Figure 5B:
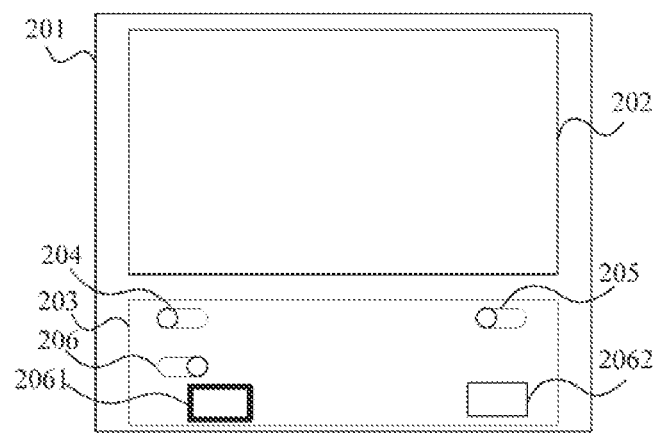

For example, when the special effect setting instruction includes the special effect adding instruction, the first terminal adds the special effect parameter of the sub-special effect selected to add by the user to the set of special effects to be superposed, according to the special effect adding instruction. Taking the "sticker" type special effect setting component 206 set in the special effect setting area 203 as an example, which may include the plurality of sub-special effect setting components, as shown in FIG. 5A, the "sticker" type special effect setting component 206 includes a sub-special effect setting component 2061 and a sub-special effect setting component 2062, among them, the sub-special effect setting component 2061 and the sub-special effect setting component 2062 represent different sub-special effects, for example, different sticker patterns. In FIG. 5A, the currently shown component states of the sub-special effect setting component 2061 and the sub-special effect setting component 2062 indicate that their corresponding sub-special effects are not set, that is, indicating that the sub-special effects respectively corresponding to the sub-special effect setting component 2061 and the sub-special effect setting component 2062 are not set, correspondingly, their corresponding special effect parameters are not added to the set of special effects to be superposed. When it is detected that the user operates in the special effect setting area 203 and selects to add the sub-special effect corresponding to the sub-special effect setting component 2061, the first application 201 can receive the special-special effect setting instruction including the special-special effect adding instruction, and then can add the special effect parameter of the sub-special effect corresponding to the sub-special effect setting component 2061 to the set of special effects to be superposed. In FIG. 5B, the sub-special effect setting component 2061 is currently shown as component state indicating that the sub-special effect corresponding to the component has been set, correspondingly, its corresponding special-special effect parameter has been added to the set of special effects to be superposed.

In the present disclosure, when it is detected that the user starts adding a certain special effect, the first application 201 may also superpose the default sub-special effect corresponding to the special effect and the default setting value of the sub-special effect with the target object. For example, when the user operates in the special effect setting area 203 and selects to add the "beauty" type special effects by starting the component corresponding to the "beauty" type special effects, the first application 201 can receive the special effect setting instruction including the special effect adding instruction, and then the default setting value of the default sub-special effect included in the "beauty" type special effects can be added to the set of special effects to be superposed.

For another example, when the special effect setting instruction includes a special effect canceling instruction, the first terminal may delete the special effect parameter of the sub-special effect selected to cancel by the user from the set of special effects to be superposed, according to the special effect canceling instruction. For example, in the case that the special effect parameter of the sub-special effect corresponding to the sub-special effect setting component 2061 has been added to the set of special effects to be superposed, when it is detected that the user clicks the sub-special effect setting component 2061 again, the first application 201 can receive the special effect setting instruction including the special effect canceling instruction, and then the special effect parameter of the sub-special effect corresponding to the sub-special effect setting component 2061 can be deleted from the set of special effects to be superposed. In one embodiment, when it is detected that the user cancels a certain special effect, the first application 201 may delete the special effect parameters of all sub-special effects of the special effect from the set of special effects to be superposed.

Figure 5C:
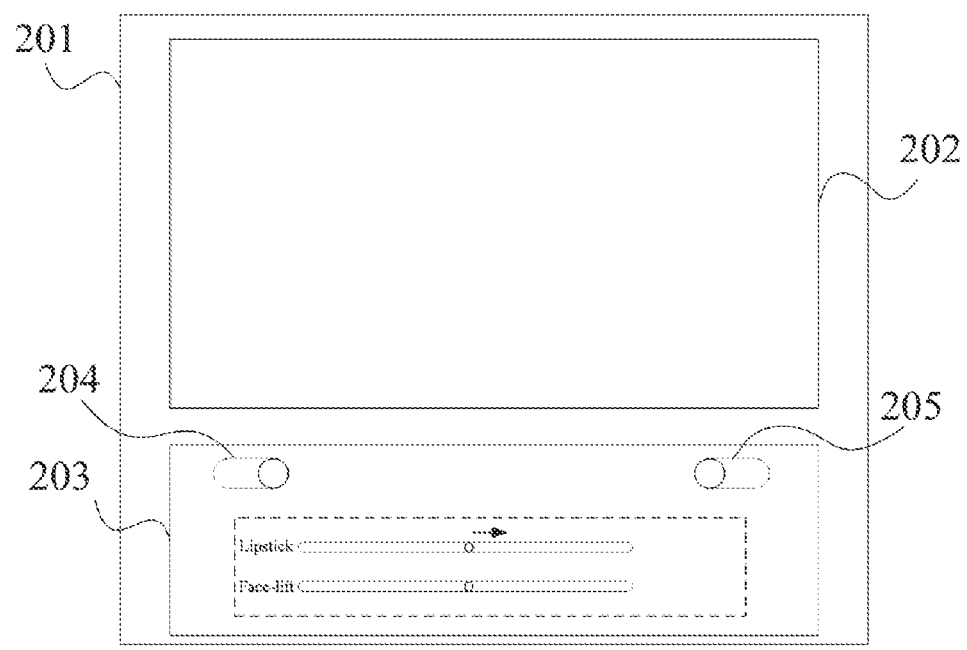

For another example, the above-mentioned special effect parameter also includes a special effect parameter value of the corresponding sub-special effect to be superposed. When the special effect setting instruction includes the special effect adjusting instruction, the first terminal may adjust the special effect parameter value of the sub-special effect selected to adjust by the user in the set of special effects to be superposed, according to the special effect adjusting instruction. For example, when it is detected that the user operates in the special effect setting area 203 and selects to add the "beauty" type special effects, the first application 201 may further display the sub-special effect setting component of the sub-special effect included in the "beauty" type special effects in the special effect setting area 203. As shown in FIG. 5C, the special effect setting area 203 displays the "lipstick" sub-special effect setting component and the "face-lift" sub-special effect setting component. The user can adjust a degree value of "face-lift" according to actual needs. For example, sliding an adjustment lever in the "face-lift" sub-special effect setting component in a direction of an arrow in FIG. 5C, to adjust the degree value of "face-lift" from currently displayed 50% to 70%, correspondingly, the first application 201 can receive the special effect setting instruction including the special effect adjusting instruction, and then can adjust the special effect parameter value in the special effect parameter of the "face-lift" sub-special effect in the set of special effects to be superposed.

Similarly, when the setting component of each sub-special effect included in the "beauty" type special effects is displayed in the special effect setting area 203, the sub-special effect setting component can be covered with the "sticker" type special effect setting component 206, that is, the "sticker" type special effect setting component 206 cannot be displayed in the special effect setting area 203 in FIG. 5C. However, after the adjustment of the special effect parameters of the sub-special effect selected to adjust by the user is completed, the setting component of each sub-special effect included in the "beauty" type special effects will exit from the special effect setting area 203, correspondingly, the "sticker" type special effect setting component 206 will be displayed in the special effect setting area 203 again.

It is worth noting that the contents shown in FIG. 2A and FIG. 2B, FIG. 4, and FIG. 5A to FIG. 5C are only used as scene examples when using the video processing method provided by the present disclosure, which are only for the purpose of illustration, so that those skilled in the art can better understand the video processing method provided by the present disclosure, but are not used to limit the present disclosure.

In S1032, determining the plurality of special effects to be superposed according to the updated set of special effects to be superposed.

Considering the actual application of the sub-special effects stored in the set of special effects to be superposed, some special effects or sub-special effects may not be suitable for synchronous superposition because they can perform special effect processing on the same part of the target object (e.g., a "AR" type special effects and a "face deformation" type special effects are not suitable for synchronous superposition, the "lipstick" sub-special effect included in the "beauty" type special effects and the "lipstick" sub-special effect included in the "sticker" type special effects are not suitable for synchronous superposition, a "blusher" sub-special effect included in the "beauty makeup" type special effects and a "blusher" sub-special effect included in the "sticker" type special effects are not suitable for synchronous superposition, and a "big head" sub-special effect and the "face-lift" sub-special effect are not suitable for synchronous superposition, etc.), therefore, in the present disclosure, the special effect parameters of the sub-special effects stored in the updated set of special effects to be superposed can be further analyzed to determine whether the plurality of sub-special effects can be superposed. If it is determined that they can be superposed, each sub-special effect in the set of special effects to be superposed will be determined as a sub-special effect to be superposed. If it is determined that some or all of the sub-special effects cannot be superposed at the same time, it is necessary to select from these sub-special effects that cannot be superposed at the same time to determine the sub-special effects to be superposed.

The above S1032 may further include: determining whether one or more groups of mutually exclusive sub-special effects exists in the updated set of special effects to be superposed according to the special effect parameter of the sub-special effect to be superposed in the updated set of special effects to be superposed; in response to determining that mutually exclusive sub-special effects exist, for each group of mutually exclusive sub-special effects, selecting one of the mutually exclusive sub-special effects as an enabled sub-special effect according to a priority parameter in the special effect parameters of the mutually exclusive sub-special effects; determining the enabled sub-special effect as the sub-special effect to be superposed; and determining the plurality of special effects to be superposed according to the special effect parameter of a determined sub-special effect to be superposed.

In this embodiment, the special effect parameter of each sub-special effect may further include a mutual exclusion parameter, and the mutual exclusion parameter is used to indicate a mutually exclusive sub-special effect of the corresponding sub-special effect to be superposed. By setting the mutual exclusion parameter, a sub-special effect with a mutually exclusive relationship can be set in the special effect parameter of at least one sub-special effect. Among them, the mutually exclusive sub-special effect of a sub-special effect may be one or more. In this way, for each sub-special effect to be superposed in the updated set of special effects to be superposed, it is determined that whether a sub-special effect mutually exclusive with the special effects to be superposed exists in the updated set of special effects to be superposed, according to the mutual exclusion parameter in the special effect parameters of the superposed sub-special effect, if there is a mutually exclusive sub-special effect, the sub-special effect to be superposed and the determined sub-special effect can be regarded as a group of mutually exclusive sub-special effects.

For example, the special effect parameter of the sub-special effect may include a mutual exclusion parameter, and the mutual exclusion parameter includes an identification of other sub-special effects mutually exclusive with the sub-special effect. Assuming that the updated set of special effects to be superposed stores the special effect parameter of a sub-special effect 1 (for example, the "blusher" sub-special effect included in the "beauty makeup" type special effects), the special effect parameters of a sub-special effect 2 (for example, the "blusher" sub-special effect included in the "sticker" type special effects), the special effect parameters of a sub-special effect 3 (for example, the "fashion glasses" sub-special effect included in the "sticker" type special effects) and the special effect parameters of a sub-special effect 4 (for example, the "eyebrow" sub-special effect included in the "beauty" type special effects), the mutual exclusion parameter included in the special effect parameter of the sub-special effect 1 includes the identification of the sub-special effect 2, and, the mutual exclusion parameter included in the special-special effect parameters of the sub-special effect 3 includes the identification of the sub-special effect 4. In this way, the first application can determine that the sub-special effect 1 and the sub-special effect 2 are mutually exclusive sub-special effects, the sub-special effect 3 and the sub-special effect 4 are mutually exclusive sub-special effects, based on the mutual exclusion parameter included in the special effect parameter of sub-special effect to be superposed in the updated set of special effects to be superposed. And the sub-special effect 1 and the sub-special effect 2 are regarded as a group of mutually exclusive sub-special effects, and, the sub-special effect 3 and the sub-special effect 4 are regarded as a group of mutually exclusive sub-special effects.

When determining that one or more groups of mutually exclusive sub-special effects exist in the updated set of special effects to be superposed according to the above method, it indicates that these sub-special effects cannot coexist, that is, cannot be superposed at the same time. In this case, it is necessary to select one special effect from the mutually exclusive special effects as the enabled special effect to superpose with the target object in the video frame. For example, the special effect parameter of the sub-special effect may also include a priority parameter and an adding time parameter. Accordingly, for each group of mutually exclusive sub-special effects, the sub-special effect with the highest priority is determined according to the priority parameter in the special effect parameters of the mutually exclusive sub-special effects in the group, and the sub-special effect with the highest priority will be used as the enabled sub-special effect, while the sub-special effect with the non-highest priority in the group will be ignored and will not be used as the enabled sub-special effect. If the priority of each sub-special effect in the mutually exclusive sub-special effects is the same, then the adding time parameter in the special effect parameters of the mutually exclusive sub-special effects are compared, and a most recently added sub-special effect in the mutually exclusive sub-special effects will be used as the enabled sub-special effect, while the sub-special effect added earlier in the mutually exclusive sub-special effects will be ignored and will not be used as the enabled sub-special effect.

Following the above example, the special effect parameters of the sub-special effect 1 to the sub-special effect 4 include priority parameters and adding time parameters, and, it is determined that the priority of the sub-special effect 1 is higher than the priority of the sub-special effect 2, and the priority of the sub-special effect 3 is the same as the priority of the sub-special effect 4, according to the priority parameters included in the special effect parameters of each sub-special effect, furthermore, it is determined that the adding time of the sub-special effect 3 is earlier than the adding time of the sub-special effect 4 according to the adding time parameters in the special effect parameters of the sub-special effect 3 and the sub-special effect 4. Therefore, the first application can take the sub-special effect 1 and the sub-special effect 4 as the enabled sub-special effect, that is, the sub-special effect 1 and the sub-special effect 4 are determined as the sub-special effect to be superposed.

In addition, for other sub-special effects other than mutually exclusive sub-special effects in the updated set of special effects to be superposed, since no sub-special effect mutually exclusive with the other sub-special effects in the updated set of special effects to be superposed, the first application may use both the other sub-special effects and the above-determined enabled sub-special effects as sub-special effects to be superposed. Following the above example, assuming that the updated set of special effects to be superposed also includes the special effect parameter of a sub-special effect 5 (for example, a certain background image sub-special effect in the "filter" type special effects), and no mutually exclusive relationship exists between the sub-special effect 5 and the sub-special effect 1 to the sub-special effect 4, thus the first application can also take the sub-special effect 5 as the sub-special effect to be superposed. In this way, it can finally be determined that the sub-special effects to be superposed include the sub-special effect 1, the sub-special effect 4 and the sub-special effect 5. After that, the plurality of special effects to be superposed to which the sub-special effect 1, the sub-special effect 4 and the sub-special effect 5 belong are determined according to the special effect parameters of the sub-special effect 1, the sub-special effect 4 and the sub-special effect 5, and the sub-special effect 1, the sub-special effect 4 and the sub-special effect 5 are superposed with the target object, so as to implement the superposition of the plurality of special effects with the target object in the current video frame.

Using this embodiment to determine the plurality of special effects to be superposed can avoid using sub-special effects with a mutually exclusive relationship as sub-special effects to be superposed, and ensure that the plurality of special effects to be superposed with the target object are logically and normally superposed special effects, to implement normal video rendering effect.

In addition, when the user selects to add special effects, they often add the plurality of special effects in rapid succession. Different from the video special effect processing methods in the related art, in the above method provided by the present disclosure, by providing a set of special effects to be superposed, a special effect caching mechanism can be implemented. That is to say, the special effect parameter of the special effect selected to add by the user will be stored in the set of special effects to be superposed first, and the first application will not immediately process the current video frame according to the special effect, but will update the set of special effects to be superposed first, after that, determine the plurality of special effects to be superposed to superpose with the target object in the video frame according to the updated set of special effects to be superposed.

By providing the set of special effects to be superposed, if the user selects to add the plurality of special effects in the process of updating the set of special effects to be superposed, it is possible to superpose the plurality of special effects at one time on the basis of the current video frame, there is no need for the terminal to perform a video special effect processing and rendering process each time the user adds a sub-special effect included in a special effect, as the related art. In this way, the processing efficiency of special effects can be effectively improved, the unnecessary intermediate video rendering processes are avoided, and the video frame superposed with the plurality of special effects can be directly provided to the user, thereby improving user experience.

It should be noted that, if only one sub-special effect to be superposed exists in the updated set of special effects to be superposed, at this time, the first application will superpose the sub-special effect to be superposed with the target object to acquire the processed video frame.

In addition, if no sub-special effect to be superposed is included in the updated set of special effects to be superposed, it means that the user does not currently selects to add the special effect, or the user cancels all previously added special effects, at this time, the first application retains the current video frame.

Since the special effects to be superposed rendered later will block the special effects to be superposed previously rendered when rendering different special effects to be superposed, in order to ensure effect of the special effects, it is necessary to determine a rendering sequence of the special effects to be superposed. For example, the "beauty" type special effects can be rendered first, after that the "sticker" type special effects can be rendered.

Therefore, in the present disclosure, the above S104 may further include: determining a processing sequence of the plurality of special effects to be superposed; superposing the plurality of special effects to be superposed with the target object according to the processing sequence of the plurality of special effects to be superposed, to acquire the processed video frame.

In one embodiment, the processing sequence of the plurality of special effects to be superposed may include a sequence of adding time from early to late, that is, the earlier the special effect to be superposed added, the higher the processing sequence.

In another embodiment, the above step of determining the processing sequence of the plurality of special effects to be superposed may further include:

determining the processing sequence of the plurality of special effects to be superposed according to a processing sequence parameter of each special effect to be superposed. That is to say, in this embodiment, the processing sequence of the special effects to be superposed is sorted according to the processing sequence parameter.

Among them, the processing sequence parameter of the special effect is used to indicate the processing sequence of the special effect itself relative to other special effects. For example, assuming that the plurality of special effects to be superposed may include: a special effect to be superposed 1, a special effect to be superposed 2, and a special effect to be superposed 3. Among them, a processing sequence parameter of the special effect to be superposed 1 is a parameter p1, a processing sequence parameter of the special effect to be superposed 2 is a parameter p2, and a processing sequence parameter of the special effect to be superposed 3 is a parameter p3, if the parameter p3 is greater than the parameter p2, and the parameter p2 is greater than the parameter p1, the processing sequence is: the special effect to be superposed 3, the special effect to be superposed 2, and the special effect to be superposed 1.

It is worth noting that, for different special effects to be superposed with the same processing sequence parameter, the special effects to be superposed can be further sorted according to the adding time of each special effect to be superposed from early to late, the earlier the special effect to be superposed added, the higher the processing sequence.

Through the above technical solution, during the one-time processing of the plurality of special effects to be superposed on the current video frame, the superposition of special effects can be implemented in order, to ensure a smooth progress of the video special effect processing.

Figure 6:
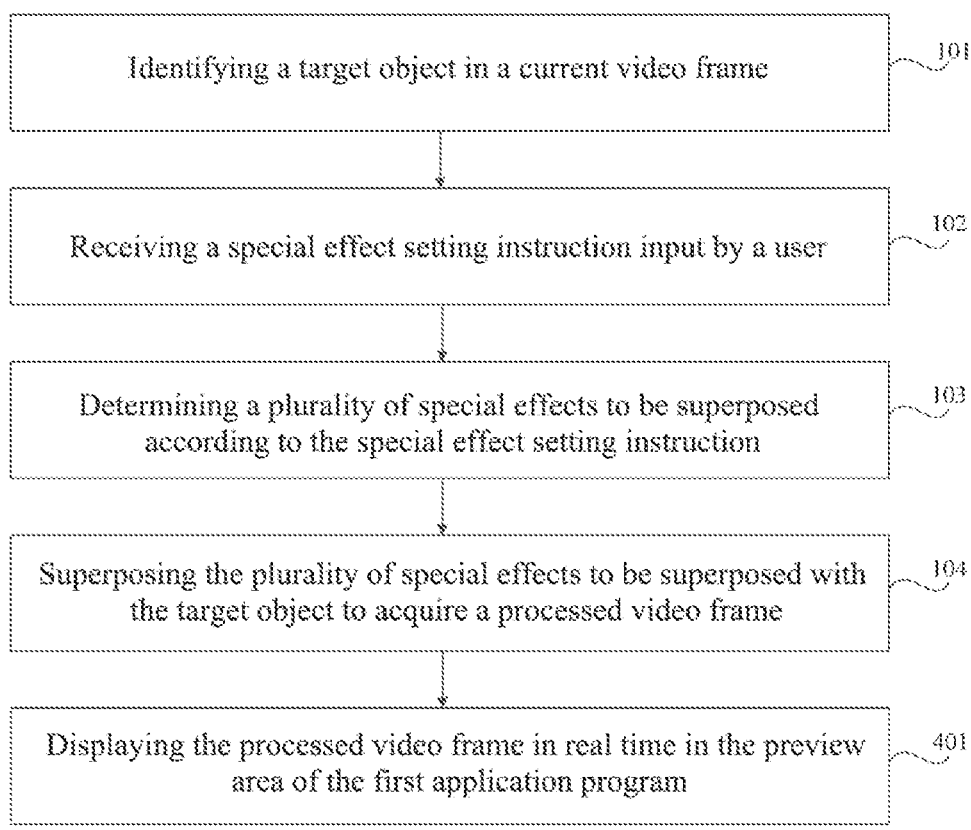
FIG. 6 is a flowchart of a video processing method according to another exemplary embodiment.

FIG. 6 is a flowchart of a video processing method according to another exemplary embodiment. As shown in FIG. 6, in addition to the above S101 to S104, the method may further include S401.

In S401, displaying the processed video frame in real time in the preview area of the first application.

In this embodiment, the first application may display the special effect setting interface, and the special effect setting interface includes a preview area. After obtaining the processed video frame, the first application can display the processed video frame in its preview area in real time (as shown in FIG. 2B). In this way, the user can watch the video after special effect processing in real time by the special effect setting interface provided by the first application.

Figure 7:
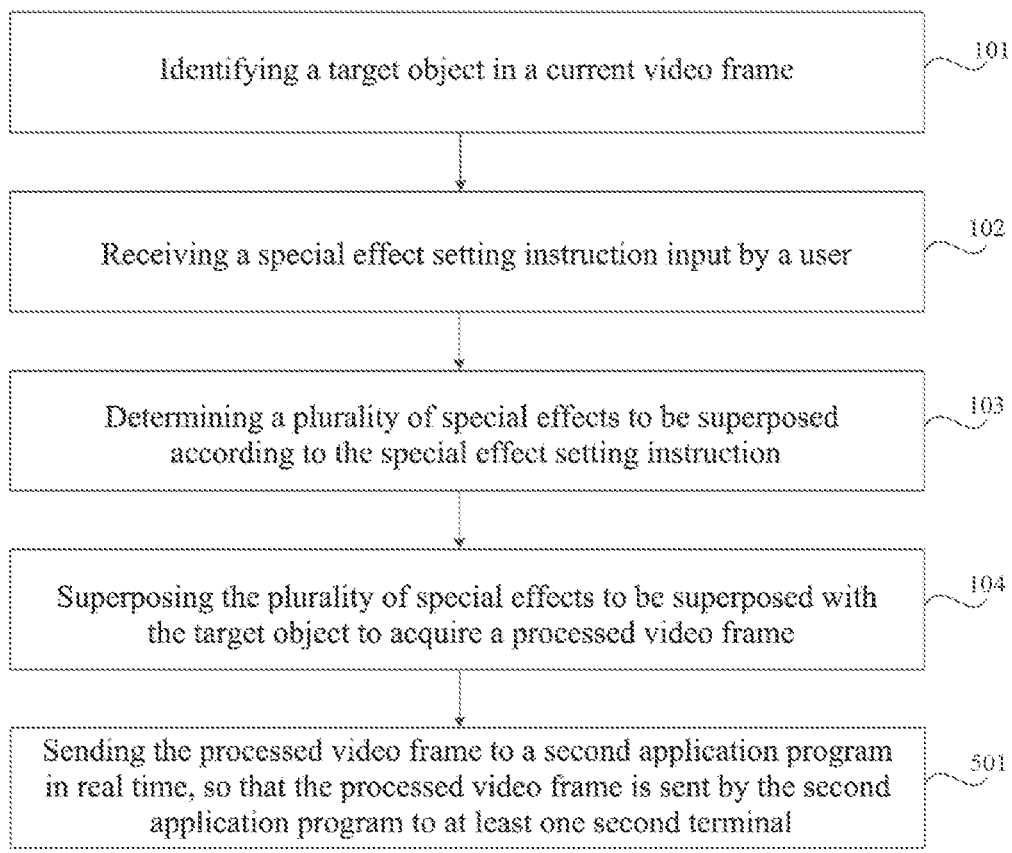
FIG. 7 is a flowchart of a video processing method according to another exemplary embodiment.

FIG. 7 is a flowchart of a video processing method according to another exemplary embodiment. As shown in FIG. 7, in addition to the above S101 to S104 or S401, the method may further include S501.

In S501, sending the processed video frame to a second application in real time, so that the processed video frame is sent by the second application to at least one second terminal.

Among them, the second application and the first application are installed on the first terminal, and the second application may be an application different from the first application. Data transmission may be implemented between the first application and the second application by virtual middleware in the first terminal. For example, the second application may be any one of the following: an application applied for a video call, an application applied for a short video, an application applied for a live broadcast, an application applied for a teleconference, an application applied for a social, etc. In this way, in this embodiment, in the case that the first application is an application dedicated to the application of the video special effect processing, it can provide a video special effect processing service for the second application, so that the video frame processed by special effect is sent by the second application to the at least one second terminal, so that the processed video frame is presented by the at least one second terminal. Among them, the second terminal may be a terminal that is conducting a video session with the first terminal, or, the second terminal may be a terminal that is watching a live broadcast, or the second terminal may be a terminal that is participating in a video conference, which is not limited in the present disclosure.

In this embodiment, after the first application obtains the processed video frame, the processed video frame may be transmitted to the second application in communicational connection with the first application, so that the second application can send the processed video frame to the second terminal, so that the processed video frame is presented by the second terminal.

In addition, the second application may also have a video rendering capability, thus, through the above technical solution, adaptation of the first application to any second application having a video rendering capability can be implemented. In this way, the second application can receive the video frame processed by special effect without re-development of the second application, and then the video frame with special effects and rendered can be sent to the second terminal, so that the video frame after special effect processing is presented by the second terminal.

In another embodiment, the above method may also include S401 and S501 at the same time, that is, both the first terminal and the second terminal can present the processed video frame in real time.

Figure 8:
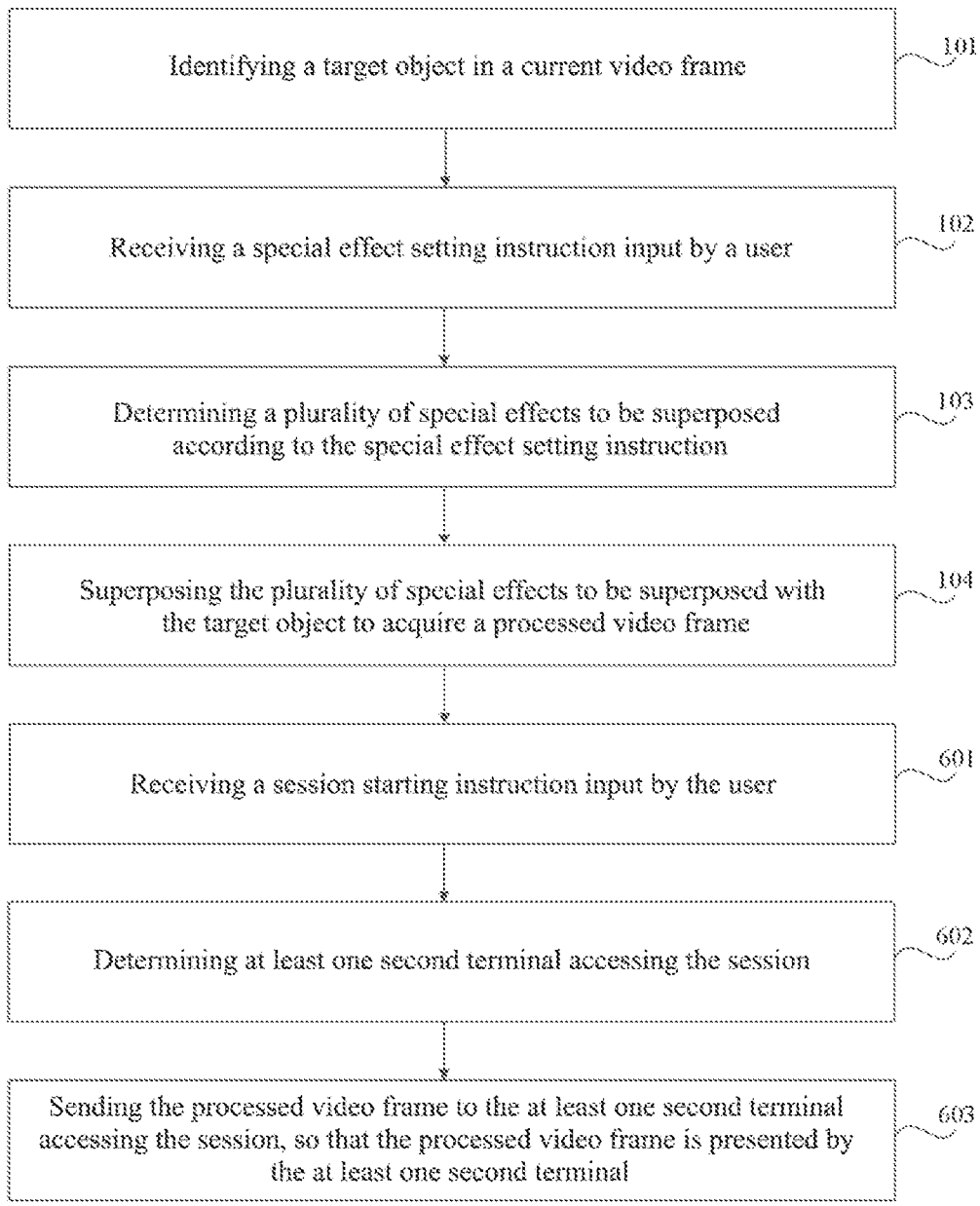
FIG. 8 is a flowchart of a video processing method according to another exemplary embodiment.

In one embodiment, as shown in FIG. 8, in addition to the above S101 to S104, the method may further include:

in S601, receiving a session starting instruction input by the user;

in S602, determining at least one second terminal accessing the session; and in S603, sending the processed video frame to the at least one second terminal accessing the session, so that the processed video frame is presented by the at least one second terminal. In this embodiment, the first terminal may receive a session starting instruction input by the user, and a session invitation may be initiated to one or more second terminals through the instruction. When determining that at least one second terminal accesses the session, the first terminal may send the processed video frame to the at least one second terminal accessing the session, and the processed video frame is presented by the at least one second terminal, thereby the video frame after superposing special effects are presented to other session participant. In this way, the video frame after the user of the first terminal superposed with the plurality of special effects can be presented on the terminal of other session participant, thereby improving the user experience during the session.

In an embodiment, the above method may be applied to the first application of the first terminal, that is, steps S601-S603 are executed by the first application.

In addition, in an embodiment, the above method may also include S501 and S601-S603 at the same time, that is, steps S601-S603 are executed by the second application.

Figure 9:
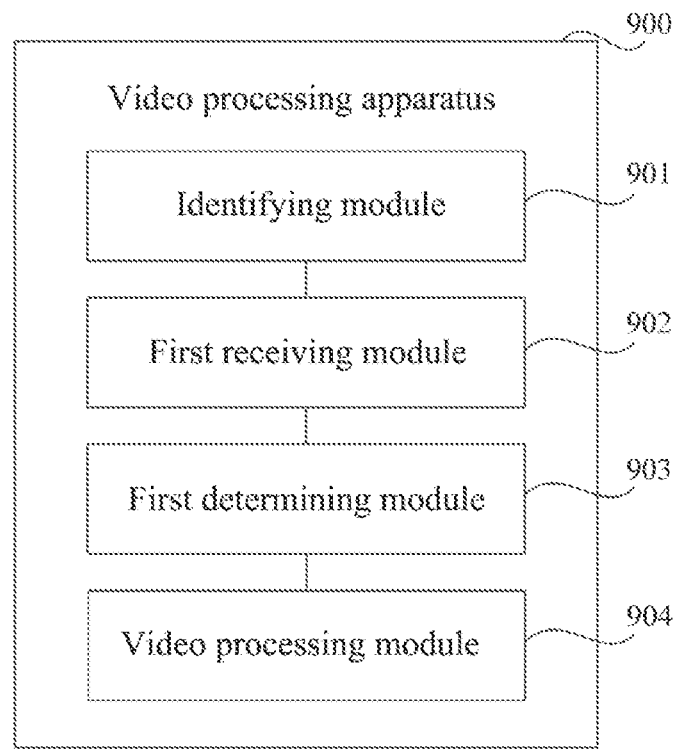
FIG. 9 is a schematic structural diagram of a video processing apparatus according to an exemplary embodiment.

FIG. 9 is a schematic structural diagram of a video processing apparatus 900 according to an exemplary embodiment. As shown in FIG. 9, the video processing apparatus 900 can be applied to the first terminal, including:

an identifying module 901, configured to identify a target object in a current video frame;

a first receiving module 902, configured to receive a special effect setting instruction input by a user;

a first determining module 903, configured to determine a plurality of special effects to be superposed according to the special effect setting instruction; and a video processing module 904, configured to superpose the plurality of special effects to be superposed with the target object to acquire a processed video frame.

Through the above technical solution, the synchronous superposition of the plurality of special effects can be implemented by one video processing process based on the current video frame, so that the plurality of special effects can take effect at the same time, thereby improving the processing efficiency of special effects. In addition, since the video frame superposed with the plurality of special effects can be directly acquired, the terminal can provide the user with the video frame superposed with the plurality of special effects by one video rendering process. In this way, by omitting the unnecessary intermediate video rendering process, not only the video processing efficiency and the terminal performance can be improved, but also the user experience can be improved.

In an implementation, the video processing module 904 includes:
- a first determining submodule, configured to determine a processing sequence of the plurality of special effects to be superposed; and
- a first processing submodule, configured to superpose the plurality of special effects to be superposed with the target object according to the processing sequence of the plurality of special effects to be superposed, to acquire the processed video frame.

In an implementation, the first determining submodule is configured to: determine the processing sequence of the plurality of special effects to be superposed according to a processing sequence parameter of each special effect to be superposed.

In an implementation, each special effect to be superposed of the plurality of special effects to be superposed includes at least one sub-special effect to be superposed, and the first determining module 903 includes:
- a first updating submodule, configured to update a set of special effects to be superposed according to the special effect setting instruction, where the set of special effects to be superposed includes a special effect parameter of each sub-special effect to be superposed in the plurality of special effects to be superposed, and the special effect parameter includes a special effect type to which the corresponding sub-special effect to be superposed belongs; and
- a second determining submodule, configured to determine the plurality of special effects to be superposed according to the updated set of special effects to be superposed.

In an implementation, the first updating submodule is configured to: w % ben the special effect setting instruction includes a special effect adding instruction, add the special effect parameter of the sub-special effect selected to add by the user to the set of special effects to be superposed according to the special effect adding instruction; when the special effect setting instruction includes a special effect canceling instruction, delete the special effect parameter of the sub-special effect selected to cancel by the user from the set of special effects to be superposed according to the special effect canceling instruction; when the special effect setting instruction includes a special effect adjusting instruction, adjust a special effect parameter value of the sub-special effect selected to adjust by the user in the set of special effects to be superposed according to the special effect adjusting instruction, among them, the special effect parameter further includes the special effect parameter value of the corresponding sub-special effect to be superposed.

In an implementation, the second determining submodule includes:
- a third determining submodule, configured to determine whether one or more groups of mutually exclusive sub-special effects exists in the updated set of special effects to be superposed according to the special effect parameter of the sub-special effect to be superposed in the updated set of special effects to be superposed;
- a fourth determining submodule, configured to in response to determine that mutually exclusive sub-special effects exist, for each group of mutually exclusive sub-special effects, select one of the mutually exclusive sub-special effects as an enabled sub-special effect according to a priority parameter in the special effect parameters of the mutually exclusive sub-special effects;
- a fifth determining submodule, configured to determine the enabled sub-special effect as the sub-special effect to be superposed; and
- a second updating submodule, configured to determine the plurality of special effects to be superposed according to the special effect parameter of a determined sub-special effect to be superposed.

In an implementation, the fourth determining submodule is configured to: compare the priority parameters in the special effect parameters of the mutually exclusive sub-special effects, and take the sub-special effect with a highest priority as the enabled sub-special effect; or if the priority parameter of each sub-special effect in the mutually exclusive sub-special effects is the same, compare adding time parameters in the special effect parameters of the mutually exclusive sub-special effects, and use a most recently added sub-special effect in the mutually exclusive sub-special effects as the enabled sub-special effect.

In an implementation, the special effect parameter of each sub-special effect to be superposed further includes a mutual exclusion parameter, and the mutual exclusion parameter is used to indicate a mutually exclusive sub-special effect with the corresponding sub-special effect to be superposed, among them, the third determining submodule is configured to: for each sub-special effect to be superposed in the updated set of special effects to be superposed, determine whether a mutually exclusive sub-special effect with the sub-special effect to be superposed exist in the updated set of special effects to be superposed according to the mutual exclusion parameter in the special effect parameter of the sub-special effect to be superposed, and take the sub-special effects to be superposed and the determined sub-special effect as a group of mutually exclusive sub-special effects.

In an implementation, the video processing apparatus 900 is applied to the first application installed on the first terminal, and, the video processing apparatus 900 may further include:
- a video presenting module, configured to display the processed video frame in real time in a preview area of the first application; and/or,
- a first sending module, configured to send the processed video frame to a second application in real time, so that the processed video frame is sent by the second application to at least one second terminal and displayed by the at least one second terminal, among them, the first application and the second application are located on the first terminal, and the second terminal is a terminal different from the first terminal.

In an implementation, the video processing apparatus 900 may further include:
- a display module, configured to display a special effect setting interface, where the special effect setting interface includes a special effect setting area, and a plurality of special effect setting components are provided in the special effect setting area; and a receiving module, configured to receive the special effect setting instruction input by the user by continuously detecting an operation for the plurality of special effect setting components.

In an implementation, the video processing apparatus 900 may further include:
- a second receiving module, configured to receive a session starting instruction input by the user;
- a second determining module, configured to determine that at least one second terminal accesses a session, and
- a second sending module, configured to send the processed video frame to the at least one second terminal accessing the session, so that the processed video frame is presented by the at least one second terminal.

Regarding the apparatus in the above embodiments, the specific manner in which each module performs operations has been described in detail in the embodiment of the method, and will not be described in detail here.

The above modules may be implemented as a software component executed on one or more general-purpose processors, or may be implemented as hardware, such as a programmable logic device and/or an application specific integrated circuit, that perform certain functions or combinations thereof. In some embodiments, these modules may be embodied in the form of a software product, the software product may be stored in non-volatile memory medium, and these non-volatile memory medium include enabling computer devices (e.g., a personal computer, a server, a network device, a mobile terminal, etc.) to implement the methods described in the embodiments of the present disclosure. In an embodiment, the above modules can also be implemented in a single device, or can be distributed on a plurality of devices. The functions of these modules can be combined with each other or further split into a plurality of submodules.

Figure 10:
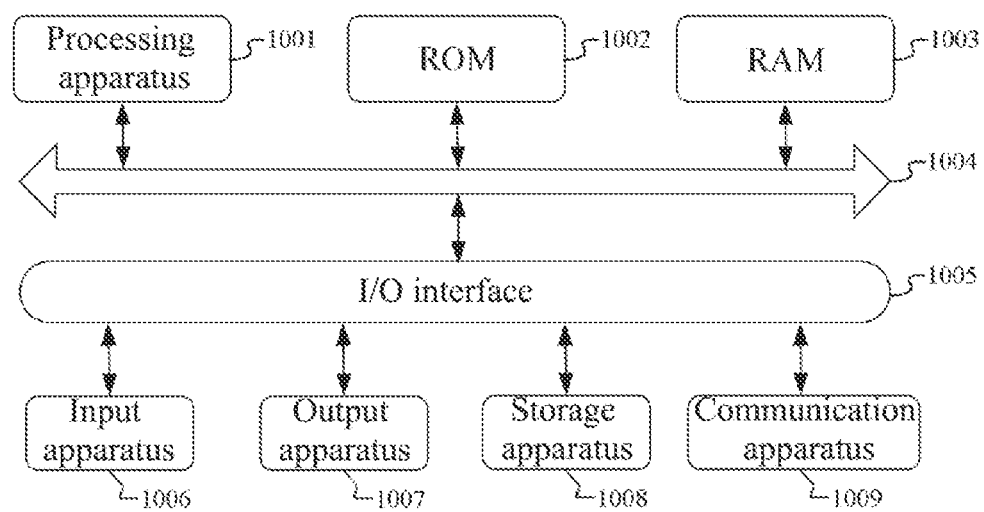
FIG. 10 is a schematic structural diagram of an electronic device according to an exemplary embodiment.

Referring to FIG. 10 below, it shows a schematic structural diagram of an electronic device 1000 suitable for implementing the embodiments of the present disclosure. The terminal device in the embodiments of the present disclosure may include, but are not limited to, a mobile terminal such as a mobile phone, a notebook computer, a digital broadcast receiver, a PDA (Personal Digital Assistant), a PAD (Portable Android Device), a PMP (Portable Media Player), an in-vehicle terminal (e.g., an in-vehicle navigation terminal), a personal wearable electronic device, etc., and a fixed terminal such as a digital TV, a desktop computer, etc. The electronic device shown in FIG. 10 is only an example, and should not impose any limitation on the function and the scope of use of the embodiments of the present disclosure.

As shown in FIG. 10, the electronic device 1000 may include a processing apparatus 1001 and a storage apparatus 1008. The storage apparatus 1008 is configured to store a program for executing the method described in each method embodiment above; and the processing apparatus 1001 is configured to execute the program stored in the memory, to implement the functions of the embodiments of the present disclosure described above and/or other desired functions. The processing apparatus (such as a central processor, a graphics processor, etc.) 1001, which can execute various appropriate actions and processes according to the program stored in a read-only memory (ROM) 1002 or the program loaded into a random access memory (RAM) 1003 from the storage apparatus 1008. In the RAM 1003, various programs and data necessary for the operation of the electronic device 1000 are also stored. The processing apparatus 1001, the ROM 1002, and the RAM 1003 are connected to each other through a bus 1004. An input/output (I/O) interface 1005 is also connected to the bus 1004.

Generally, the following apparatuses can be connected to the I/O interface 1005: an input apparatus 1006 including, for example, a touch screen, a touch pad, a keyboard, a mouse, a camera, a microphone, an accelerometer, a gyroscope, etc.; an output apparatus 1007 including, for example, a liquid crystal display (LCD), a speaker, a vibrator, etc.; a storage apparatus 1008 including, for example, a magnetic tape, a hard disk, etc.; and a communication apparatus 1009. The communication apparatus 1009 may allow the electronic device 1000 to communicate wirelessly or by wire with other devices to exchange data. While FIG. 10 shows the electronic device 1000 having various apparatuses, it should be understood that not all of the shown apparatuses are required to be implemented or provided. More or fewer apparatuses may alternatively be implemented or provided.

In particular, according to the embodiments of the present disclosure, the process described above with reference to the flowcharts may be implemented as a computer software program. For example, the embodiments of the present disclosure include a computer program product, including a computer program carried on a non-transitory computer-readable medium, where the computer program contains a program code for executing the method described in the each embodiment above. In such an embodiment, the computer program may be downloaded and installed from the network via the communicating apparatus 1009, or installed from the storage apparatus 1008, or installed from the ROM 1002. When the computer program is executed by the processing apparatus 1001, the steps in the methods of the embodiments of the present disclosure are executed, so as to implement the functions of the embodiments described in the present disclosure and/or other desired functions.

It should be noted that the above computer readable medium of the present disclosure may be a computer readable signal medium or a computer readable storage medium or any combination of the above two. The computer readable storage medium may be, for example, but not limited to, an electrical, a magnetic, an optical, an electromagnetic, an infrared, or a semiconductor system, apparatus or device, or a combination of any of the above. More specific examples of the computer readable storage medium may include, but are not limited to, electrical connection with one or more wires, a portable computer disk, a hard disk, a random access memory (RAM), a read only memory (ROM), an erasable programmable read only memory (EPROM or Flash), a fiber optic, a portable compact disc read only memory (CD-ROM), an optical storage device, a magnetic storage device, or any suitable combination of the above. In the present disclosure, a computer readable storage medium may be any tangible medium that contains or stores a program that may be used by or in conjunction with an instruction execution system, apparatus, or device. In the present disclosure, however, the computer readable signal medium may include a data signal propagated in a baseband or as a part of a carrier wave with a computer readable program code carried therein. This propagated data signal may take many forms, Including, but not limited to, an electromagnetic signal, an optical signal, or any suitable combination of the foregoing. The computer readable signal medium may also be any computer readable medium other than the computer readable storage medium, where the computer readable signal medium may send, propagate, or transmit a program for use by or in connection with an instruction execution system, apparatus, or device. A program code included in the computer readable medium may be transmitted using any suitable medium including, but not limited to, an electrical wire, an optical cable, RF (radio frequency), etc., or any suitable combination of the above.

In some implementations, a terminal may use any currently known or future developed network protocol such as a HTTP (HyperText Transfer Protocol) for communication, and may interconnect with any form or medium of digital data communication (e.g., communication network). Examples of communication networks include a local area network ("LAN"), a wide area network ("WAN"), an internet (e.g., the Internet), and a peer-to-peer network (e.g., an ad hoc peer-to-peer network), and any currently known or future developed networks.

The above computer readable medium may be included in the above electronic device; and it may also exist alone without being assembled into the electronic device.

The above computer-readable medium carries one or more programs, and when the above one or more programs are executed by the electronic device, the electronic device is enabled to: identify the target object in the current video frame; receive the special effect setting instruction input by the user; determine the plurality of special effects to be superposed according to the special effect setting instruction; and superpose the plurality of special effects to be superposed with the target object to acquire the processed video frame.

A computer program code for performing operations of the present disclosure may be written in one or more programming languages or a combination thereof, the above programming languages include but not limited to object-oriented programming languages—such as Java, Smalltalk, C++, and also include conventional procedural programming languages—such as the "C" language or similar programming languages. The program code may be performed entirely on the user's computer, partly on the user's computer, as a stand-alone software package, partly on the user's computer and partly on a remote computer, or entirely on the remote computer or the server. In cases involving the remote computer, the remote computer may be connected to the user's computer through any kind of network, including a local area network (LAN) or a wide area network (WAN), or may be connected to an external computer (e.g., connected using an Internet service provider via the Internet).

Flowcharts and block diagrams in the drawings illustrate system architectures, functions, and operations which may be implemented according to systems, methods and computer program products of various embodiments of the present disclosure. In this regard, each block in the flowcharts or the block diagrams may represent a module, a program segment, or a portion of code that contains one or more executable instructions for implementing the specified functions. It should also be noted that, in some alternative implementations, the functions noted in the blocks may occur in an order different from that noted in the drawings. For example, two blocks shown in a succession may, in fact, be performed substantially in parallel, or they may sometimes be performed in a reverse order, and this depends upon the function involved. It is also to be noted that each block in the block diagrams and/or the flowcharts, and the combination of blocks in the blocks diagrams and/or the flowcharts, may be implemented in a dedicated hardware-based system that perform specified functions or operations, or may be implemented by the combination of dedicated hardware and computer instructions.

The modules involved in the embodiments of the present disclosure may be implemented in a software manner, and may also be implemented in a hardware manner. Where a name of a module does not constitute a limitation of the module itself under certain cases, for example, a receiving module may also be described as "a special effect setting instruction receiving module".

The functions described herein above may be performed, at least in part, by one or more hardware logic components. For example, without limitation, exemplary types of hardware logic components that may be used include: a field programmable gate array (FPGA), an application specific integrated circuit (ASIC), application specific standard parts (ASSP), a system on chip (SOC), a complex programming logic device (CPLD) and the like.

In the context of the present disclosure, a machine readable medium may be a tangible medium that may contain or store a program for use by or in connection with an instruction execution system, apparatus, or device. The machine readable medium may be a machine readable signal medium or a machine readable storage medium. The machine readable medium may include, but are not limited to, an electronic, a magnetic, an optical, an electromagnetic, an infrared, or a semiconductor system, apparatus or device, or any suitable combination of the foregoing. More specific examples of the machine readable storage medium may include one or more wire-based electrical connections, a portable computer disk, a hard disk, a random access memory (RAM), a read only memory (ROM), an erasable programmable read only memory (EPROM or flash memory), a fiber optic, a compact disk read only memory (CD-ROM), an optical storage device, a magnetic storage device, or any suitable combination of the foregoing.

According to one or more embodiments of the present disclosure, Example 1 provides a video processing method, applied to a first terminal, including: identifying a target object in a current video frame; receiving a special effect setting instruction input by a user; determining a plurality of special effects to be superposed according to the special effect setting instruction; and superposing the plurality of special effects to be superposed with the target object to acquire a processed video frame.

According to one or more embodiments of the present disclosure, Example 2 provides the method of Example 1, the superposing the plurality of special effects to be superposed with the target object to acquire the processed video frame includes: determining a processing sequence of the plurality of special effects to be superposed; and superposing the plurality of special effects to be superposed with the target object according to the processing sequence of the plurality of special effects to be superposed, to acquire the processed video frame.

According to one or more embodiments of the present disclosure, Example 3 provides the method of Example 2, the determining the processing sequence of the plurality of special effects to be superposed includes: determining the processing sequence of the plurality of special effects to be superposed according to a processing sequence parameter of each special effect to be superposed.

According to one or more embodiments of the present disclosure, Example 4 provides the method of Example 1, each special effect to be superposed in the plurality of special effects to be superposed includes at least one sub-special effect to be superposed, and the determining the plurality of special effects to be superposed according to the special effect setting instruction includes: updating a set of special effects to be superposed according to the special effect setting instruction, where the set of special effects to be superposed includes a special effect parameter of each sub-special effect to be superposed in the plurality of special effects to be superposed, and the special effect parameter includes a special effect type to which the corresponding sub-special effect to be superposed belongs; and determining the plurality of special effects to be superposed according to the updated set of special effects to be superposed.

According to one or more embodiments of the present disclosure. Example 5 provides the method of Example 4, the updating the set of special effects to be superposed according to the special effect setting instruction includes: when the special effect setting instruction includes a special effect adding instruction, adding the special effect parameter of the sub-special effect selected to add by the user to the set of special effects to be superposed according to the special effect adding instruction; when the special effect setting instruction includes a special effect canceling instruction, deleting the special effect parameter of the sub-special effect selected to cancel by the user from the set of special effects to be superposed according to the special effect canceling instruction; and when the special effect setting instruction includes a special effect adjusting instruction, adjusting a special effect parameter value of the sub-special effect selected to adjust by the user in the set of special effects to be superposed according to the special effect adjusting instruction, where the special effect parameter further includes the special effect parameter value of the corresponding sub-special effect to be superposed.

According to one or more embodiments of the present disclosure, Example 6 provides the method of Example 4, the determining the plurality of special effects to be superposed according to the updated set of special effects to be superposed includes: determining whether one or more groups of mutually exclusive sub-special effects exist in the updated set of special effects to be superposed according to the special effect parameter of the sub-special effect to be superposed in the updated set of special effects to be superposed; in response to determining that mutually exclusive sub-special effects exist, for each group of mutually exclusive sub-special effects, selecting one of the mutually exclusive sub-special effects as an enabled sub-special effect according to a priority parameter in the special effect parameters of the mutually exclusive sub-special effects; determining the enabled sub-special effect as the sub-special effect to be superposed; and determining the plurality of special effects to be superposed according to the special effect parameter of a determined sub-special effect to be superposed.

According to one or more embodiments of the present disclosure, Example 7 provides the method of Example 6, the for each group of mutually exclusive sub-special effects, selecting one of the mutually exclusive sub-special effects as the enabled sub-special effect according to the priority parameter in the special effect parameters of the mutually exclusive sub-special effects includes: comparing the priority parameters in the special effect parameters of the mutually exclusive sub-special effects, and using the sub-special effect with a highest priority as the enabled sub-special effect; or if the priority parameter of each sub-special effect in the mutually exclusive sub-special effects is the same, comparing adding time parameters in the special effect parameters of the mutually exclusive sub-special effects, and using a most recently added sub-special effect in the mutually exclusive sub-special effects as the enabled sub-special effect.

According to one or more embodiments of the present disclosure, Example 8 provides the method of Example 6, the special effect parameter of each sub-special effect to be superposed further includes a mutual exclusion parameter, and the mutual exclusion parameter is used to indicate a mutually exclusive sub-special effect with the corresponding sub-special effect to be superposed, where the determining whether the one or more groups of mutually exclusive sub-special effects exists in the updated set of special effects to be superposed according to the special effect parameter of the sub-special effect to be superposed in the updated set of special effects to be superposed includes: for each sub-special effect to be superposed in the updated set of special effects to be superposed, determining whether a mutually exclusive sub-special effect with the sub-special effect to be superposed exist in the updated set of special effects to be superposed according to the mutual exclusion parameter in the special effect parameter of the sub-special effect to be superposed, and taking the sub-special effects to be superposed and the determined sub-special effect as a group of mutually exclusive sub-special effects.

According to one or more embodiments of the present disclosure, Example 9 provides the method of Example 1, the method is applied to a first application installed on the first terminal, and the method further includes: displaying the processed video frame in real time in a preview area of the first application; and/or, sending the processed video frame to a second application in real time, so that the processed video frame is sent by the second application to at least one second terminal and displayed by the at least one second terminal, where the first application and the second application are installed on the first terminal.

According to one or more embodiments of the present disclosure, Example 10 provides the method of Example 1, the method further includes: displaying a special effect setting interface, where the special effect setting interface includes a special effect setting area, and a plurality of special effect setting components are provided in the special effect setting area; and the receiving the special effect setting instruction input by the user includes: receiving the special effect setting instruction input by the user by continuously detecting an operation for the plurality of special effect setting components.

According to one or more embodiments of the present disclosure, Example 11 provides the method of Example 1, the method further includes: receiving a session starting instruction input by the user; determining that at least one second terminal accesses a session; and sending the processed video frame to the at least one second terminal accessing the session, so that the processed video frame is presented by the at least one second terminal.

According to one or more embodiments of the present disclosure, Example 12 provides a video processing apparatus, applied to a first terminal and including: an identifying module, configured to identify a target object in a current video frame; a first receiving module, configured to receive a special effect setting instruction input by a user; a first determining module, configured to determine a plurality of special effects to be superposed according to the special effect setting instruction; and a video processing module, configured to superpose the plurality of special effects to be superposed with the target object to acquire a processed video frame.

According to one or more embodiments of the present disclosure, Example 13 provides a computer-readable medium having a computer program stored thereon which, when executed by a processing apparatus, steps of the method according to any one of Examples 1-11

According to one or more embodiments of the present disclosure. Example 14 provides an electronic device, including: a storage apparatus having a computer program stored thereon; and a processing apparatus, configured to execute the computer program in the storage apparatus, to implement steps of the method of any one of Examples 1-11.

According to one or more embodiments of the present disclosure, a computer program product is also provided, where the program product includes: a computer program which, when executed by the processing apparatus, implement steps of the method described in any of the embodiments of the present disclosure.

According to one or more embodiments of the present disclosure, a computer program is provided, where the computer program, when executed by a processing apparatus, implement steps of the method described in any of the embodiments of the present disclosure.

The above description is only a preferred embodiment of the present disclosure and an illustration of the applied technical principles. Those skilled in the art should understand that the disclosure scope involved in the present disclosure is not limited to the technical solutions formed by the specific combination of the above technical features, and should also cover other technical solutions formed by arbitrarily combining the above technical features or its equivalent features without departing from the above disclosed concept, for example, a technical solution formed by replacing the above features with the technical features disclosed in the present disclosure (but not limited to) with similar functions.

In addition, although operations are described in a particular order, this should not be understood as requiring that the operations be performed in the particular order shown or in a sequential order. Under certain circumstances, multitasking and parallel processing may be advantageous. Likewise, although the above discussion contains several specific implementation details, these should not be construed as limitations on the scope of the present disclosure. Certain features that are described in the context of a separate embodiment may also be implemented additively in a single embodiment. Rather, various features that are described in the context of a single embodiment may also be implemented in multiple embodiments separately or in any suitable sub—although operations are described in a particular order, this should not be understood as requiring that the operations be performed in the particular order shown or in a sequential order. Under certain circumstances, multitasking and parallel processing may be advantageous. Likewise, although the above discussion contains several specific implementation details, these should not be construed as limitations on the scope of the present disclosure. Certain features that are described in the context of a separate embodiment may also be implemented additively in a single embodiment. Rather, various features that are described in the context of a single embodiment may also be implemented in multiple embodiments separately or in any suitable sub-combination.

Although the subject matter has been described in a language specific to structural features and/or methodological logical actions, it is to be understood that the subject matter defined in the appended claims is not necessarily limited to the specific features or actions described above. Rather, the specific features and actions described above are merely example forms for implementing the claims. Regarding the apparatus in the above embodiments, the specific manner in which each module performs operations has been described in detail in the embodiments of the method, and will not be described in detail here.

What is claimed is:

1. A video processing method, applied to a first terminal, comprising:
    identifying a target object in a current video frame;
    receiving a special effect setting instruction input by a user;
    determining a plurality of special effects to be superposed according to the special effect setting instruction; and
    superposing the plurality of special effects to be superposed with the target object to acquire a processed video frame;
    wherein determining the plurality of special effects to be superposed according to the special effect setting instruction comprises:
    updating a set of special effects to be superposed according to the special effect setting instruction; and
    determining the plurality of special effects to be superposed according to updated set of special effects to be superposed;
    wherein the determining the plurality of special effects to be superposed according to the updated set of special effects to be superposed comprises:
    determining whether one or more groups of mutually exclusive sub-special effects exist in the updated set of special effects to be superposed;
    for each group of mutually exclusive sub-special effects, selecting one of the mutually exclusive sub-special effects as an enabled sub-special effect according to a priority parameter in special effect parameters of the mutually exclusive sub-special effects;
    determining the enabled sub-special effect as a sub-special effect to be superposed; and
    determining the plurality of special effects to be superposed according to a special effect parameter of a determined sub-special effect to be superposed, wherein the exclusive sub-special effects are not superposed at the same time.

2. The method according to claim 1, wherein the superposing the plurality of special effects to be superposed with the target object to acquire the processed video frame comprises:
    determining a processing sequence of the plurality of special effects to be superposed; and
    superposing the plurality of special effects to be superposed with the target object according to the processing sequence of the plurality of special effects to be superposed, to acquire the processed video frame.

3. The method according to claim 2, wherein the determining the processing sequence of the plurality of special effects to be superposed comprises:
    determining the processing sequence of the plurality of special effects to be superposed according to a processing sequence parameter of each special effect to be superposed.

4. The method according to claim 1, wherein each special effect to be superposed in the plurality of special effects to be superposed comprises at least one sub-special effect to be superposed;
    wherein the set of special effects to be superposed comprises a special effect parameter of each sub-special effect to be superposed in the plurality of special effects to be superposed, and the special effect parameter comprises a special effect type to which the sub-special effect to be superposed belongs.

5. The method according to claim 4, wherein the updating the set of special effects to be superposed according to the special effect setting instruction comprises:

when the special effect setting instruction comprises a special effect adding instruction, adding the special effect parameter of the sub-special effect selected to add by the user to the set of special effects to be superposed according to the special effect adding instruction;

when the special effect setting instruction comprises a special effect canceling instruction, deleting the special effect parameter of the sub-special effect selected to cancel by the user from the set of special effects to be superposed according to the special effect canceling instruction; and when the special effect setting instruction comprises a special effect adjusting instruction, adjusting a special effect parameter value of the sub-special effect selected to adjust by the user in the set of special effects to be superposed according to the special effect adjusting instruction, wherein the special effect parameter further comprises the special effect parameter value of the sub-special effect to be superposed.

6. The method according to claim 1, wherein the determining whether one or more groups of mutually exclusive sub-special effects exist in the updated set of special effects to be superposed comprises:

determining whether one or more groups of mutually exclusive sub-special effects exist in the updated set of special effects to be superposed according to a special effect parameter of a sub-special effect to be superposed in the updated set of special effects to be superposed.

7. The method according to claim 6, wherein the special effect parameter of each sub-special effect to be superposed further comprises a mutual exclusion parameter, and the mutual exclusion parameter is used to indicate a mutually exclusive sub-special effect with the sub-special effect to be superposed, wherein the determining whether the one or more groups of mutually exclusive sub-special effects exist in the updated set of special effects to be superposed according to the special effect parameter of the sub-special effect to be superposed in the updated set of special effects to be superposed comprises:

for each sub-special effect to be superposed in the updated set of special effects to be superposed, determining whether a mutually exclusive sub-special effect with the sub-special effect to be superposed exist in the updated set of special effects to be superposed according to the mutual exclusion parameter in the special effect parameter of the sub-special effect to be superposed, and taking the sub-special effects to be superposed and the determined sub-special effect as a group of mutually exclusive sub-special effects.

8. The method according to claim 1, wherein the for each group of mutually exclusive sub-special effects, selecting one of the mutually exclusive sub-special effects as the enabled sub-special effect according to the priority parameter in the special effect parameters of the mutually exclusive sub-special effects comprises:

comparing the priority parameters in the special effect parameters of the mutually exclusive sub-special effects, and using the sub-special effect with a highest priority as the enabled sub-special effect; or when the priority parameter of each sub-special effect in the mutually exclusive sub-special effects is the same, comparing adding time parameters in the special effect parameters of the mutually exclusive sub-special effects, and using a most recently added sub-special effect in the mutually exclusive sub-special effects as the enabled sub-special effect.

9. The method according to claim 1, wherein the method is applied to a first application installed on the first terminal, and the method further comprises:

displaying the processed video frame in real time in a preview area of the first application; and/or, sending the processed video frame to a second application in real time, so that the processed video frame is sent by the second application to at least one second terminal and displayed by the at least one second terminal, wherein the first application and the second application are installed on the first terminal.

10. The method according to claim 1, wherein the method further comprises:

displaying a special effect setting interface, wherein the special effect setting interface comprises a special effect setting area, and a plurality of special effect setting components are provided in the special effect setting area; and the receiving the special effect setting instruction input by the user comprises:

receiving the special effect setting instruction input by the user by continuously detecting an operation for the plurality of special effect setting components.

11. The method according to claim 1, wherein the method further comprises:

receiving a session starting instruction input by the user;
determining that at least one second terminal accesses a session; and
sending the processed video frame to the at least one second terminal accessing the session, so that the processed video frame is presented by the at least one second terminal.

12. A video processing apparatus, applied to a first terminal, comprising:

at least one processor;
a communication interface connected with the at least one processor; and
a memory connected with the at least one processor;
wherein instructions, when executed by the at least one processor, cause the at least one processor to:
identify a target object in a current video frame;
receive, through the communication interface, a special effect setting instruction input by a user;
determine a plurality of special effects to be superposed according to the special effect setting instruction; and
superpose the plurality of special effects to be superposed with the target object to acquire a processed video frame;
wherein the instructions further cause the at least one processor to:
update a set of special effects to be superposed according to the special effect setting instruction; and
determine the plurality of special effects to be superposed according to updated set of special effects to be superposed;
wherein the instructions further cause the at least one processor to:
determine whether one or more groups of mutually exclusive sub-special effects exist in the updated set of special effects to be superposed;
for each group of mutually exclusive sub-special effects, select one of the mutually exclusive sub-special effects as an enabled sub-special effect according to a priority parameter in special effect parameters of the mutually exclusive sub-special effects;

determine the enabled sub-special effect as a sub-special effect to be superposed; and determine the plurality of special effects to be superposed according to a special effect parameter of a determined sub-special effect to be superposed, wherein the exclusive sub-special effects are not superposed at the same time.

13. The apparatus according to claim 12, wherein the instructions further cause the at least one processor to:

determine a processing sequence of the plurality of special effects to be superposed; and superpose the plurality of special effects to be superposed with the target object according to the processing sequence of the plurality of special effects to be superposed, to acquire the processed video frame;

wherein the instructions further cause the at least one processor to:

determine the processing sequence of the plurality of special effects to be superposed according to a processing sequence parameter of each special effect to be superposed.

14. The apparatus according to claim 12, wherein each special effect to be superposed in the plurality of special effects to be superposed comprises at least one sub-special effect to be superposed;

wherein the set of special effects to be superposed comprises a special effect parameter of each sub-special effect to be superposed in the plurality of special effects to be superposed, and the special effect parameter comprises a special effect type to which the sub-special effect to be superposed belongs.

15. The apparatus according to claim 14, wherein the instructions further cause the at least one processor to:

when the special effect setting instruction comprises a special effect adding instruction, add the special effect parameter of the sub-special effect selected to add by the user to the set of special effects to be superposed according to the special effect adding instruction;

when the special effect setting instruction comprises a special effect canceling instruction, delete the special effect parameter of the sub-special effect selected to cancel by the user from the set of special effects to be superposed according to the special effect canceling instruction; and when the special effect setting instruction comprises a special effect adjusting instruction, adjust a special effect parameter value of the sub-special effect selected to adjust by the user in the set of special effects to be superposed according to the special effect adjusting instruction, wherein the special effect parameter further comprises the special effect parameter value of the sub-special effect to be superposed.

16. The apparatus according to claim 12, wherein the instructions further cause the at least one processor to:

determine whether one or more groups of mutually exclusive sub-special effects exist in the updated set of special effects to be superposed according to a special effect parameter of a sub-special effect to be superposed in the updated set of special effects to be superposed.

17. The apparatus according to claim 16, wherein the special effect parameter of each sub-special effect to be superposed further comprises a mutual exclusion parameter, and the mutual exclusion parameter is used to indicate a mutually exclusive sub-special effect with the corresponding sub-special effect to be superposed; wherein the instructions further cause the at least one processor to:

for each sub-special effect to be superposed in the updated set of special effects to be superposed, determine whether a mutually exclusive sub-special effect with the sub-special effect to be superposed exist in the updated set of special effects to be superposed according to the mutual exclusion parameter in the special effect parameter of the sub-special effect to be superposed, and take the sub-special effects to be superposed and the determined sub-special effect as a group of mutually exclusive sub-special effects.

18. The apparatus according to claim 12, wherein the instructions further cause the at least one processor to:

compare the priority parameters in the special effect parameters of the mutually exclusive sub-special effects, and use the sub-special effect with a highest priority as the enabled sub-special effect; or when the priority parameter of each sub-special effect in the mutually exclusive sub-special effects is the same, compare adding time parameters in the special effect parameters of the mutually exclusive sub-special effects, and use a most recently added sub-special effect in the mutually exclusive sub-special effects as the enabled sub-special effect.

19. A non-transitory computer-readable medium having a computer program stored thereon, wherein the program, when executed by a processing apparatus, implements the following steps:

identifying a target object in a current video frame;

receiving a special effect setting instruction input by a user;

determining a plurality of special effects to be superposed according to the special effect setting instruction; and superposing the plurality of special effects to be superposed with the target object to acquire a processed video frame;

wherein the program, when executed by a processing apparatus, further implements the following steps:

updating a set of special effects to be superposed according to the special effect setting instruction; and determining the plurality of special effects to be superposed according to updated set of special effects to be superposed;

wherein the program, when executed by a processing apparatus, further implements the following steps:

determining whether one or more groups of mutually exclusive sub-special effects exist in the updated set of special effects to be superposed;

for each group of mutually exclusive sub-special effects, selecting one of the mutually exclusive sub-special effects as an enabled sub-special effect according to a priority parameter in special effect parameters of the mutually exclusive sub-special effects;

determining the enabled sub-special effect as a sub-special effect to be superposed; and determining the plurality of special effects to be superposed according to a special effect parameter of a determined sub-special effect to be superposed, wherein the exclusive sub-special effects are not superposed at the same time.

* * * * *